(12) United States Patent
Sourani

(10) Patent No.: US 6,512,790 B1
(45) Date of Patent: Jan. 28, 2003

(54) METHOD, SYSTEM AND APPARATUS FOR TRANSMITTING CODED TELECOMMUNICATION SIGNALS

(75) Inventor: Sason Sourani, Hod Hasharon (IL)

(73) Assignee: ECI Telecom Ltd., Petach Tikva (IL)

( * ) Notice: Subject to any disclaimer, the term of this patent is extended or adjusted under 35 U.S.C. 154(b) by 0 days.

(21) Appl. No.: 09/465,456

(22) Filed: Dec. 17, 1999

(30) Foreign Application Priority Data

Dec. 23, 1998 (IL) .................................................. 127698

(51) Int. Cl.$^7$ ................................................. H04B 1/66
(52) U.S. Cl. .................... 375/240; 375/220; 379/93.08; 370/535
(58) Field of Search ................................. 375/240, 219, 375/220, 260; 379/4, 93.01, 93.08, 93.09, 100.12, 100.17, 220.01, 232; 358/425, 426.01, 426.08, 426.12; 370/468, 492, 493, 501, 521, 535, 536, 537, 538, 540, 542

(56) References Cited

U.S. PATENT DOCUMENTS

| | | | | |
|---|---|---|---|---|
| 4,729,033 A | * | 3/1988 | Yoshida | 358/435 |
| 4,771,335 A | * | 9/1988 | Obara | 370/498 |
| 4,885,755 A | * | 12/1989 | Yoshida | 375/285 |
| 5,117,453 A | * | 5/1992 | Piasecki et al. | 379/100.17 |
| 5,526,350 A | * | 6/1996 | Gittins et al. | 370/468 |
| 5,682,386 A | * | 10/1997 | Arimilli et al. | 370/468 |
| RE35,740 E | | 3/1998 | Piasecki et al. | 379/100 |
| 6,205,208 B1 | * | 3/2001 | Detlefsen et al. | 379/93.05 |
| 6,246,490 B1 | * | 6/2001 | Sebestyen | 358/425 |
| 6,275,502 B1 | * | 8/2001 | Arimilli | 370/468 |
| 6,320,876 B1 | * | 11/2001 | Virdee et al. | 370/468 |

FOREIGN PATENT DOCUMENTS

WO 96/31993 10/1996

* cited by examiner

Primary Examiner—Chi Pham
Assistant Examiner—Khanh Cong Tran
(74) Attorney, Agent, or Firm—Nath&Associates PLLC; Harold L. Novick (57) ABSTRACT

Transmission of coded signals of different types in a system comprising a plurality of operative telecommunication stations is described. The system allows transmission of different type of signals in their coded form towards a receiving end of the transmission path and ensures that the signals are decoded into their decompressed digital form only in the last operative decoder along the transmission path. Signal classification messages are transmitted along the transmission path and allow operating the system in an environment of various types of signals.

32 Claims, 3 Drawing Sheets

METHOD, SYSTEM AND APPARATUS FOR TRANSMITTING CODED TELECOMMUNICATION SIGNALS

FIELD OF THE INVENTION

The present invention relates to telecommunications systems in general, and in particular to the transmission of compressed signals in telecommunications system.

BACKGROUND OF THE INVENTION

Telecommunications has moved in the recent years towards digital networks carrying voice, facsimile and other signals. One known way in the art to increase the efficiency of such networks is to transmit the signals in a compressed form, thus using the available bandwidth for simultaneous transmission of more information.

U.S. Pat. No. RE 35,740 discloses a system for carrying voice, facsimile and non-facsimile voice band data. This system includes various compressing mechanisms and offers an improved detection of facsimile signals. Still, when speech, facsimile and other signals are subjected to several compression/decompression cycles, their quality degrades substantially, and at times, the signals may be received at a quality and delay that are unacceptable.

Some methods were suggested in the past to overcome this handicap. Cox et al., in International Conference on Communications, Vol. 1, June 1988, pp. 90–95, suggest a method to decrease the distortion and delay introduced while using low rate speech coding. It was suggested there that the receiving module, the compressor, searches the less significant bits of the input 64 Kb/s mu-law coded stream for the synchronization pattern. If it detects the pattern, it temporarily squelches the compressed signal and enables the de-compressor to begin padding rather than decoding. When the de-compressor is padding the low-rate frame, a new synchronization pattern is inserted into one of the non-used bits. When the far end compressor detects this new synchronization pattern it disables the squelch on its compressor and begins stripping the padded bits. However, when the compressor at the receiving end does not find the "robbed" less significant bits synchronization pattern in the 64 Kb/s stream, it will not proceed to the pad and strip state, and the de-compressor will insert the robbed bit synchronization pattern into the 64 Kb/s stream, going to the subscriber. One way of increasing the rate of the low rate bit stream suggested in this publication, is by inserting the low rate signal into the least significant bits of the mu-low word of the 64 Kb/s stream. The advantage of using such a method is that if by any chance the system treats the signal as mu-low coded speech, only low level noise signal would be noticed by the human listener.

However, one of the main drawbacks of the method described, is the fact that no other signals than voice signals can be transmitted along a transmission path comprising a number of operative compressing/decompressing devices. Furthermore, none of the methods described discloses a solution for the problem of handling a change in the type of the transmitted signals, while retaining the continuity of the communication session (e.g. switching from voice to fax during a communication session). Moreover, the traffic congestion in telecommunication networks is of a varying nature, and obviously for a system to operate efficiently it should also be adaptable to such variations.

SUMMARY OF THE INVENTION

It is therefore an object of the present invention to provide a digital telecommunication station capable of efficiently transmitting signals originating from transmitting sources of various types.

It is another object of the present invention to provide a digital communication system utilizing efficiently the bandwidth available for communication transmissions while retaining a good quality of the signal and session continuity.

Yet another object of the present invention is to provide a method for efficient handling of various types of signals.

Further objects and features of the invention will become apparent to those skilled in the art, from the following description and the accompanying drawings.

In accordance with the present invention there is provided a digital telecommunication station adapted to receive at least two different types of signals, operative in a digital communication system, and comprising:

at least one detector operative to receive signals carried along a transmission path and determine their type;

at least one switch controlled by said at least one detector, adapted to channel said signals in accordance with the determination of their type;

first identifier for determining whether said signals received are of a digital compressed form;

second identifier for determining whether the transmission path includes at least one further operative de-compressor adapted for decompressing signals when being transmitted in their compressed form;

at least two pairs of compressing/decompressing devices, each adapted to compress/decompress a different type of signals;

said transmission path does not include at least one fur first transmitter operative in response to a determination made by said second identifier that ther operative decompressor adapted for decompressing the signals being transmitted in their compressed form; and second transmitter operative in response to a determination made by said second indentifier that said transmission path does include at least one further operative decompressor adapted for decompressing the signals being transmitted in their compressed form into the decompressed digital output signals.

Preferably, said at least two different types of signals are selected from the group consisting of voice signals, fax signals, data signals, voiceband data signals and video signals. More preferably, the types of signals received by the digital communication station of the present invention include at least voice and fax types of signals.

According an embodiment of the present invention, the pairs of different compressing/decompressing devices are preferably selected from the group comprising:

encoder/decoder adapted to receive a voice signal and operate thereon;

modulator/demodulator adapted to receive a facsimile signal and operate thereon;

encoder/decoder adapted to receive a data signal and operate thereon;

voice-band data modulator/demodulator adapted to receive a voice band data signal and operate thereon; and video encoder/decoder adapted to receive a video signal and operate thereon.

By a preferred embodiment, the digital telecommunication station of the present invention is adapted to receive a signal classification message denoting the type of digital signals received by that digital telecommunication station. More preferably, the signal classification message is transmitted to denote transmission of digital signals of a type, which differs from the type of their preceding digital signals transmitted by the station during a communication session. Typically, a signal classification message is a message that is included in a frame, block or the like, and characterizes the type of digital signals included in that same frame. Preferably, the signal classification message is included in a frame carrying digital signals sand precedes the compressed digital signals of a new type contained in that frame. However, as would be appreciated by a person skilled in the art, in systems which can tolerate delays in transmission, it would also be possible to have the signal classification message indicate that digital signals of a new type have already been transmitted. Furthermore, the signal classification message may denote a change in the signal type occurring in a neighboring frame (the one before or the one after the frame which includes that message) or even in non-neighboring frames. Of course, when the change occurs in a non-neighboring frame to that which comprises the signal classification message, the message should preferably also direct to the frame in which the new type of signals are introduced for the first time, e.g. by providing an indication to the number of frames separating between these two frames, etc.

Embedding in a frame the classification of the type of signals to follow has significant advantages that the present invention provides over the known art. One of the major advantages is that in an environment that includes compressing devices, this way of operation allows to change the type of signals being transmitted during a communication session (e.g. switching from fax to voice or vice versa) while retaining the session continuity.

According to the above embodiment of present invention, a signal classification message may either be carried through the telecommunication station when generated upstream of the station, or be generated by the station and transmitted towards a further downstream telecommunication station.

A typical such signal classification message identifying the type of the signals to follow comprises the information signals of the type identified in their compressed form and stuffing bits filling the remainder of the message. According to a preferred embodiment of the invention, the stuffing bits in a message may be signals that represent the non-compressed form of the message's compressed information signals or a part thereof. Using such non-compressed signals allows reasonable monitoring of the communication session and detecting special signaling tones such as dual tone, etc.

According to a preferred embodiment of the invention, in the initialization stage of a communication session in a telecommunication station, a pre-selected type of signal is assumed, e.g. that session will be initialized as a session of voice transmission. The pre-selected type of signals would remain valid until a signal classification message identifying a new type of signal is received at the station. Preferably, the pre-selection of the signals' type is made by the system operator, reflecting the type of the most commonly expected type of traffic in the specific communication network. By one alternative of the invention, the signal classification message is embedded only prior to the occurrence of an event where an actual change the type of signals takes place. By another alternative, the signal classification message is transmitted prior to a first change in the signal type and is included thereafter in all consecutive messages, irrespective of whether there is a change in the signal type or not, until the termination of that communication session.

According to another embodiment of the invention there is provided a digital communication system for interconnecting a plurality of telecommunication trunks, carrying at least two different types of signals, via a transmission path, comprising:

first transmission means at least a first end of the transmission network for transmitting digital signals;

at least one pair of telecommunication stations of the type specified;

at least one further operative means adapted for decompressing signals being transmitted in their compressed form; and receiving means at at least a second end of the transmission network.

The term "telecommunication network" as will be used hereinafter, should be understood to encompass the various types of networks known in the art, such as TDM, synchronous and asynchronous transfer networks, IP networks, IP frame relaying networks and any other applicable packet communication networks.

As previously explained, the term "telecommunication station" is used herein to describe a combination of at least two compressing/decompressing devices, one of which is used for compressing signals when required, while the other is used as its corresponding de-compressor (e.g. one such device may be an encoder while the other a decoder, etc.). These two devices may be included within one apparatus or be separated from each other.

A "normal compression mode" of a pair of such telecommunication stations as will be referred to hereinafter, is used to denote a mode of operation in which the incoming digital signals received by a first station are compressed by the station's compressing device (the compressor), transmitted in a compressed form to the de-compressing device (decompressor) of the second station of that pair of telecommunication stations, where decompression is carried out essentially by converting the digital signals into their non-compressed form.

In a case where there is at least one further operative means adapted to decompress signals being transmitted in their compressed form, e.g. in a further pair of telecommunication stations located downstream along the transmission path, the mode of operation will be somewhat different. The information signals received will again be compressed by the compressor of the first telecommunication station, and their compressed form will be transmitted to the de-compressor of the second station of the first pair of stations. However, in this case, the compressed message will not be decompressed by the de-compressor of that second station, but instead, will be transmitted in its compressed form towards that at least one further operative means. In the case that there is a further operative pair of telecommunication stations, the message may be transmitted via the compressor of the first station of the second pair to the de-compressor of the second station of that second pair where it will be decompressed essentially into the non-compressed form of the digital signals. Still, the decompression will be carried out provided that the determination made by the identification means of that second station of the second pair of telecommunication stations is, that there is no other operative decompressor downstream. The decompressed message will then be transmitted by the first station transmission means of the second station of the second pair of telecommunication stations towards the receiving means at the downstream end of the transmission path. Such a mode of operation will be referred to hereinafter as "end-to-end compression".

According to yet another preferred embodiment of the invention, the signal classification message characterizing the type of the following signals further comprises information that allows synchronizing the operation of the telecommunication stations operating along the transmission path.

For example, the signal classification message may further include an indication of number of bits, which enables the receiving station to identify precisely when the transmission of information signals starts.

In accordance with still another preferred embodiment of the invention the signal classification message further comprises an indication of the bit integrity. Examples of such indications are check sum, various CRCs, and the like.

According to further preferred embodiment of the present invention. The transmission network of the invention further comprises means for determining the mode of operation of facsimile signals. More preferably, the first transmission means also comprises means for transmitting over the transmission network and to the receiving means, an indication of the mode of operation of the facsimile signals.

In accordance with yet another preferred embodiment of the invention, one or more of the pairs of telecommunication stations in the communication system may be operated selectively.

According to another embodiment of the present invention, the system further includes message generation and message detection means where the latter means is operative at the receiving end to detect messages transmitted by the first transmitting means.

By a further embodiment of the present invention, at least one of the digital telecommunication stations in the digital communication system is further provided with an option of establishing a communication link with more than two other digital telecommunication stations. Preferably, such a station is adapted to establish a communication with a plurality of digital telecommunication stations, each located at a different end of a telecommunication network. By another embodiment of the present invention, a full or part of a transmission sent by at least one of the telecommunication stations in the digital communication system may be received in parallel by at least two different digital telecommunication stations.

As previously explained, the prior art is concerned with the case where the signals transmitted in the "end-to-end compression" mode, are voice signals. Sacrificing less significant bits in voice carrying messages, does not constitute a major problem, as the worst case that is likely to happen is that the noise level of the conversation is increased by a certain extent. However, trying to apply this method to communication sessions in which non-voice signals are transmitted, does create a problem, for which no solution has previously been presented. Once some of the bits communication are sacrificed, the result may be a failure in communication, as the receiving end can no longer recognize the transmission thus received.

According to yet-another embodiment of the present invention there is provided a method for use in a digital communication system that comprises at least a first and a second telecommunication stations and adapted to transmit at least two different types of signals, which method comprises:

(i) transmitting a message comprising a sequence of characters identifying a first transmitting means, the type of signals to be transmitted and their destination;

(ii) establishing a communication link between a first transmitting means and a receiving means at the transmission destination;

(iii) exchanging signals between a first pair of telecommunication stations, identifying for each one of them the existence of the other and the rate for transmitting signals therebetween;

(iv) transmitting a message comprising a characterization of the signals to follow;

(v) transmitting information signals at the rate defined;

(vi) transmitting a message denoting the end of transmission; and (vii) disconnecting the communication link between the first transmitting means and the receiving means.

As previously described, the transmission path may include more thank two pairs of telecommunications stations, in which case a similar procedure of "handshaking" as described in step (iii) above, will be carried out for each two pairs of consecutive stations.

According to a preferred embodiment of the invention, the method provided is used for interconnecting a plurality of telecommunication trunks carrying at least two different types of signals.

By a preferred embodiment of the method provided by the invention, a periodic check is conducted to confirm that at least one further means adapted for decompressing signals being transmitted in their compressed form is still operative along the transmission path. Therefore, when a station becomes the last decompressing operative means along that path, it will immediately resume its de-compression mode, and the pair of telecommunication stations to which this station belongs, will begin operating under normal compressing mode. According to a further embodiment of the present invention, prior to disconnecting an operative decompressing means from the transmission path to which it is connected, a message declaring the expected disconnection of that operative compressing means is sent. When such a message is received by the neighboring telecommunication stations, each on of them will immediately resume its normal compression mode. According to a more preferred embodiment of the invention, all pairs of telecommunication stations operating along the transmission path periodically transmit their integrity signals. Once a pair of stations does not receive the integrity signal of its neighboring downstream pair of stations, it will automatically resume thee normal compression mode.

According to the end-to-end compression mode of operation described in the art, when voice signals are received at a downstream pair of telecommunication stations in a compressed form, the station operating as the encoder is disabled, and the compressed information is transmitted to the station operating as a decoder, either for decompressing if there is no further pair of telecommunication stations downstream, or for transmission to a further pair of telecommunication stations operative downstream, in a compressed form. In accordance with yet another aspect of the present invention, the telecommunication station operating as the compressor of a pair of downstream digital telecommunication stations, is not disabled as suggested in the art, but is used to keep track of the compression parameters in the messages being transmitted. Consequently, when normal compression operation is to be resumed (e.g. when a downstream pair of telecommunication stations is disconnected from the transmission path), the compressing station may revert rapidly to its normal compression mode by using the correct and updated internal compression parameters.

DETAILED DESCRIPTION OF THE INVENTION

In the modern communication traffic network, a large number of communicating channels may simultaneously occupy the full bandwidth available. Examples of such applications may be found in concurrent transmissions of voice channel(s) with or without compression, fax video, data or any combination thereof.

Figure 1:
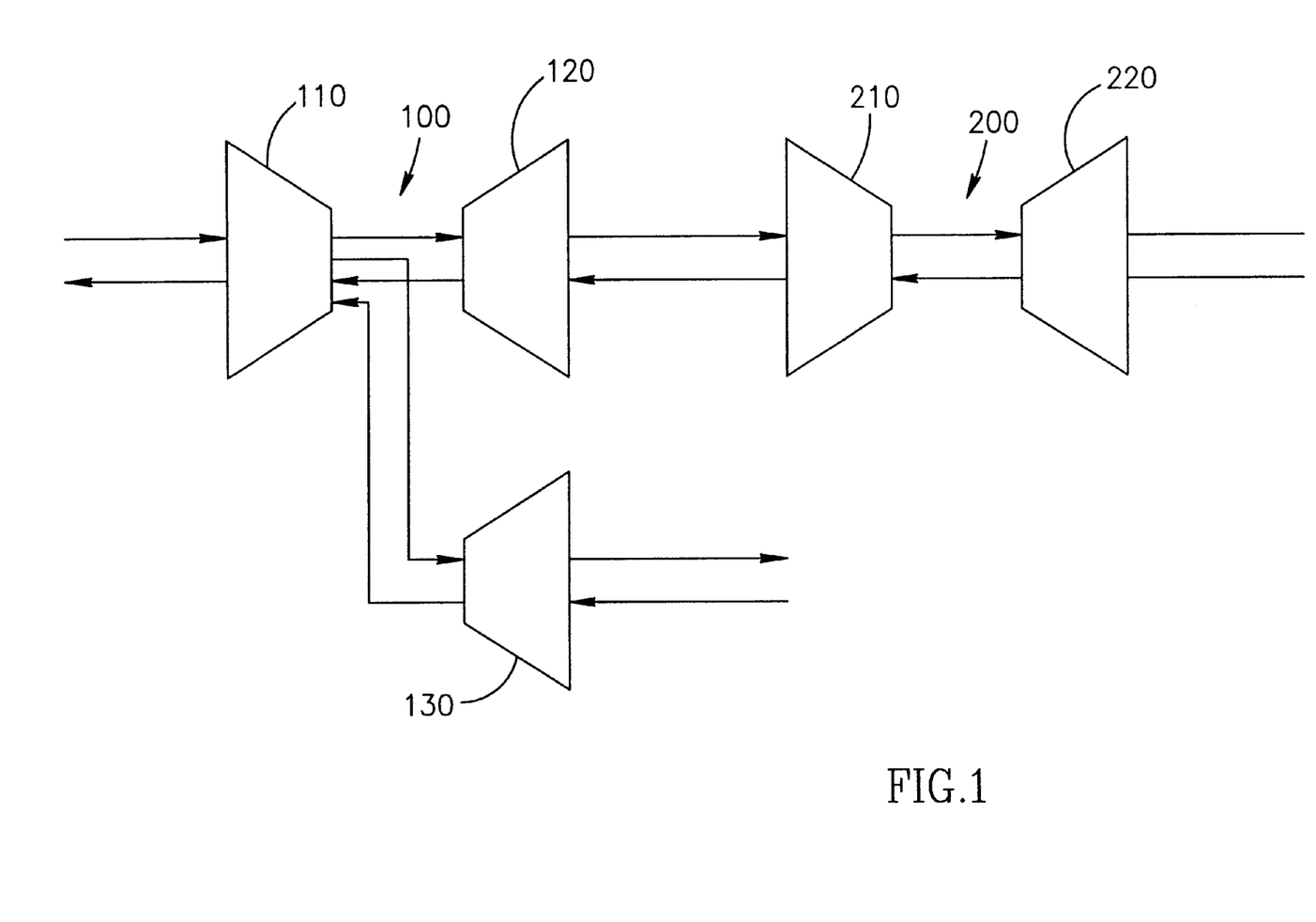
FIG. 1 illustrates communication links between various telecommunication stations.

Let us now turn to the Figures. FIG. 1 illustrates two pairs of telecommunication station, namely, 100 and 200. Each one of these two pairs of stations comprises one station operating as a compressor (110 and 210, respectively) and its counter de-compressor (120 and 220 respectively). A typical operation of these stations may be described in the following way. A transmission is received at station 110 operating as a compressor. The transmission is compressed and sent to station 120 operating as a de-compressor. Once identification means of station 120 determine the existence of another operative pair of telecommunication station (200), e.g. by detecting identification signal(s) transmitted by station 210, the end-to-end compression mode of operation is established, and the transmission will be transmitted from station 120 to station 210 in its compressed form. The transmission thus received at station 210 is further transmitted to the de-compressor 220, for decompression.

When the transmission direction is reversed, the transmission arriving is compressed by station 220 now operating as a compressor, and sent to station 210. The latter station, identifying the existence of a further operative pair of stations (100), now downstream of the transmission path, will transmit the information received in its compressed mode. The compressed information will then be transmitted by device 110 operating now as the compressing device in the pair (100) of station, to device 110, operating now as a de-compressing device, where it will be decompressed.

Another embodiment of the invention is illustrated in this FIG. 1. In accordance With this embodiment a telecommunication system (in this example station 110) may communicate with more than one corresponding counterpart thereof. In this FIG., station 110 is illustrated as having an option to communicate with either one of stations 120 and 130. As should be appreciated by a man skilled in the art, this embodiment may be implemented in a variety of ways. One example of such implementation, is, that each of the stations may communicate with any other corresponding station, each located at a different end of an IP net. Another applicable example is that a station may communicate simultaneously with at least two corresponding stations, each receiving part or all of the transmission transmitted by that station. Further types of operating digital telecommunication stations in tandem are also possible, and it should be understood that they are all encompassed by the present invention.

Figure 2:
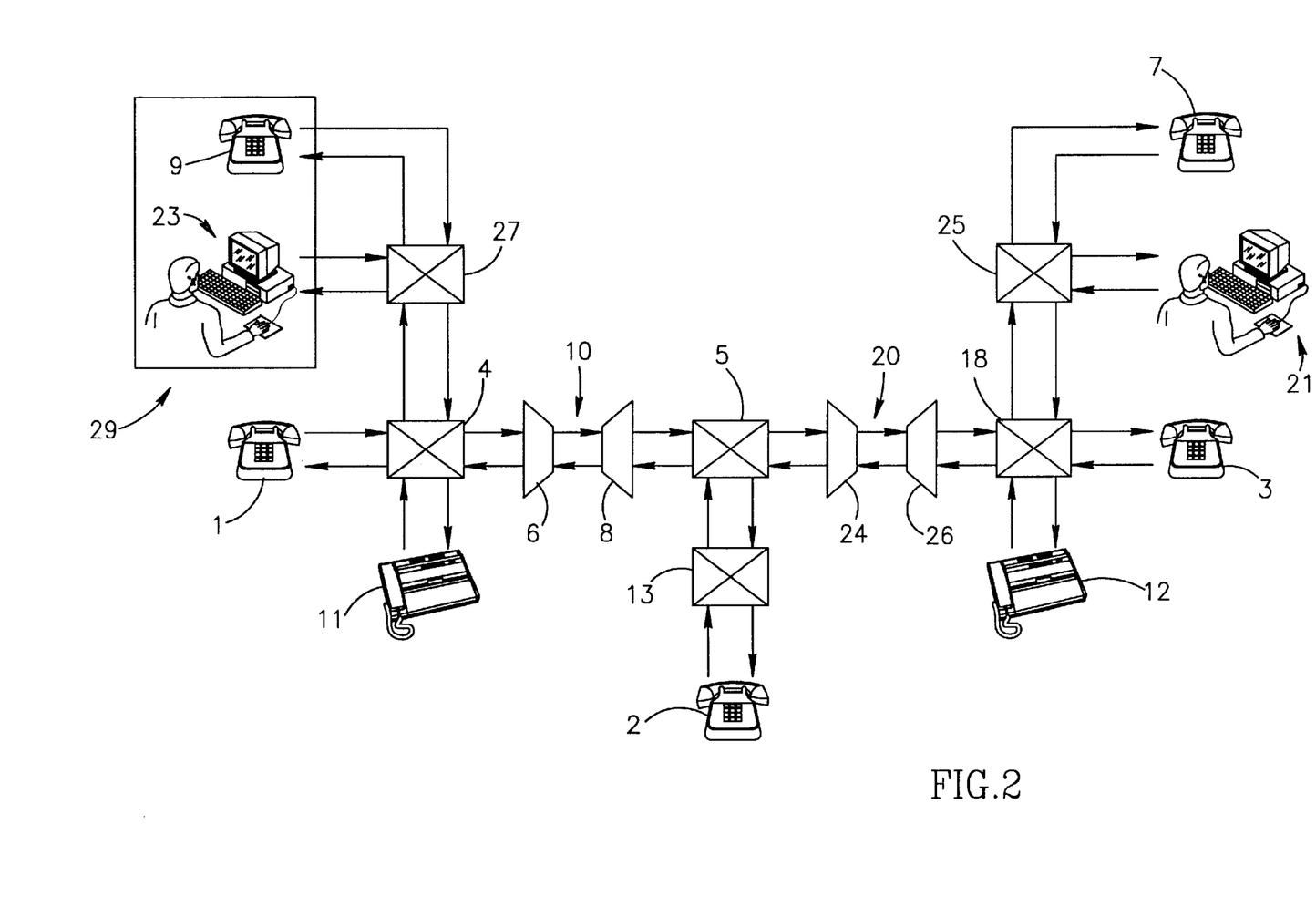
FIG. 2 describes schematically a system comprising various transmitting sources and telecommunication stations.

FIG. 2 presents a digital communication system comprising a number of transmitting/receiving means, such as telephones (1,2,3,7, and 9), facsimile machines (11 and 12), data terminals (21 and 23) and a network connecting therebetween. The network shown in this figure, comprises two pairs of telecommunication stations 10 and 20, each comprising a pair of compressing/decompressing stations, 6 and 8 and 24 and 26, respectively, as well as a number of communication exchanges (4, 5, 13, 18, 25, and 27). Certain examples demonstrating the system operation are described hereinbelow and are provided for better understanding FIG. 2.

Figure 3:
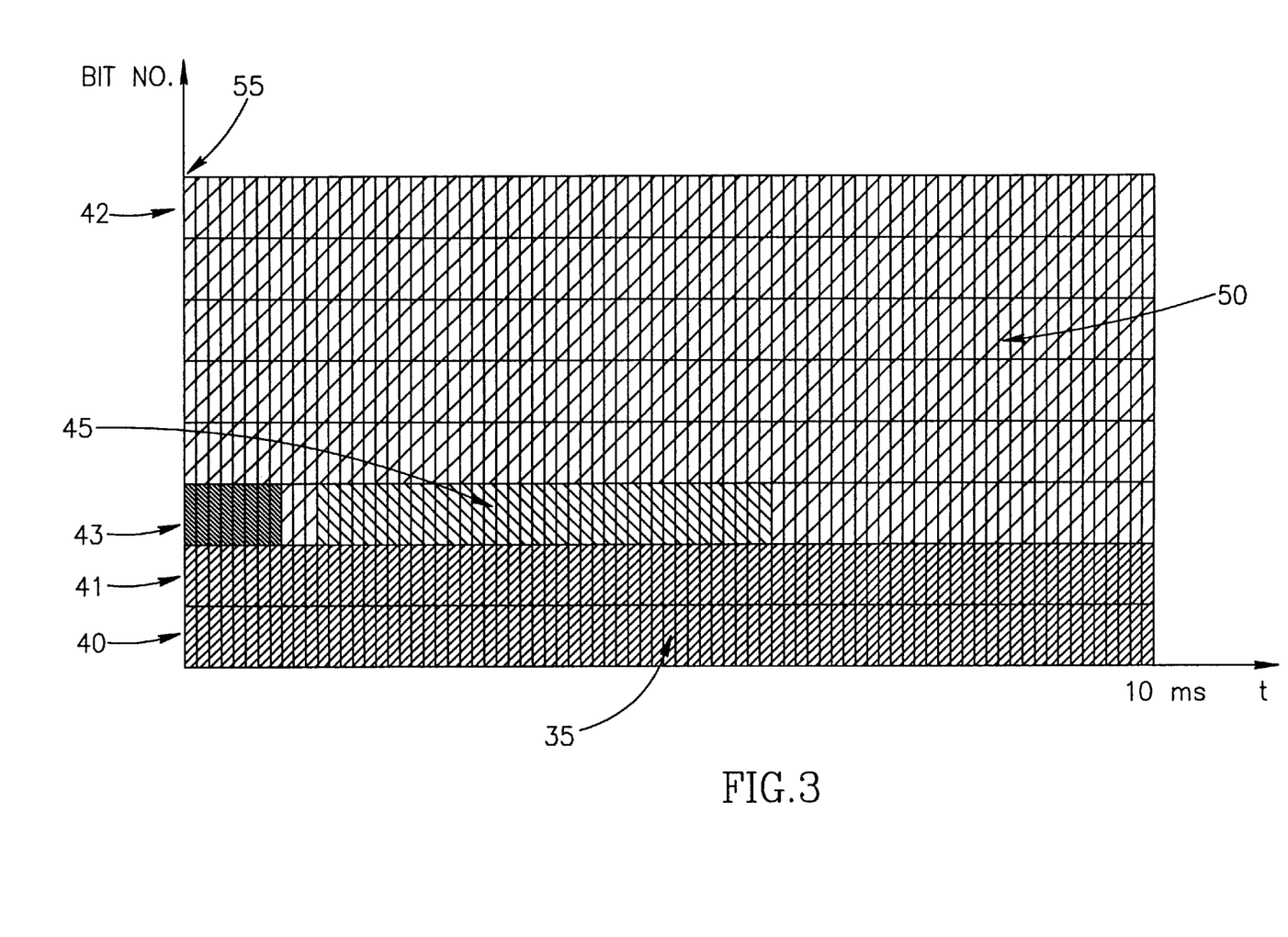
FIG. 3 presents an example of a transmission message according to the present invention for transmission in a digital communication system.

FIG. 3 presents an example of a transmission message according to the present invention. The example shown in this figure is of a 10 ms message transmitted in a digital communication network of the present invention. Although in this figure a 10 ms frame message is illustrated, such messages can be also 5 or 15 ms long, or be extended to any other suitable period of time. In FIG. 3, the horizontal axis denotes the time axis, whereas the vertical axis denotes the bit number axis, extending from bits 0, the Less Significant Bits (LSB), denoted in this FIG. As row 40, to bits 7, the most Significant Bits (MSB), denoted in FIG. 3 as row 42. Each column shown in this figure, represents one PCM sample of 8 bits, and extends for 0.125 ms.

The frame shown in this figure, comprises non-compressed bits 50, and compressed information bits 35 which fully occupy the less significant rows of bits 0 and 1 of each of the PCMs (designated as 40 and 41, respectively). Other components comprised within the exemplified frame shown in FIG. 3, are integrity bit, in this example CRC (43), which is applied to detect a disconnection in the communication, and a signal classification message 45 defining the type of the signals transmitted. Both the integrity bits and the signal classification message are shown in this example as located in row 2, one row above the compressed information. However, it should be understood that the integrity bits and/or the signal classification message may be located at a different location within the frame. Still, some restrictions are to be imposed on the chosen location, as for example the compressed bits should not be replaced by the integrity bits or by the signal classification message. On the other hand, if the integrity bits and/or the signal classification message are located in the most significant rows, this may cause a substantial noise in the non-compressed part of the frame, which may be used for other purposes such as monitoring, and the like.

Another embodiment of the invention relates to the use of the frame for synchronizing purposes. In such a case, preferably the first (55) or last columns of the frame may be used to provide an indication required for synchronization.

Furthermore, as may be understood from this figure, the algorithm used is one which compresses the 64 Kb/s of the PCM received, to a rate of 16 KB/s, where each of the fully occupied rows with compressed information (40 and 41) of the frame, represents a 8 Kb/s of compressed signals.

The following non-limiting examples will demonstrate various embodiments of the present invention.

EXAMPLES

Example 1

Let us now consider an example where a voice call is to be transmitted from transmitting means 1 to receiving means 2, in the network exemplified in FIG. 2. As may be seen in this figure only one pair of telecommunication stations is operating along the transmission path defined. The call generated at transmitting means 1, will be routed through exchange 4, to the pair of telecommunication stations 10 where it will be identified as a voice call by station 6 controller and be channeled by the station 6 switch in accordance with this identification. The transmission will be encoded at station 6 and subsequently be transmitted to station 8. There, the transmission will be decoded essentially into the non-compressed form of the digital signals transmitted, since no further operative means for decompressing the compressed transmission is identified by station 8 identification means along the transmission path extending between 1 and 2. The decoded transmission will then be transmitted via exchanges 5 and 13, to receiving means 2.

When the reverse direction is to be applied, i.e. a transmission is to be carried from 2 to 1, the call will be routed along the same transmission path, with the exception that this time the transmitted signals will be encoded in station 8 operating now as an encoder and be decoded at station 6, operating this time as a decoder.

Example 2

This Example illustrates a case in which a voice call is to be transmitted form transmitting means 1 to receiving means 3.

In this a case, a call is again routed through exchange 4 to the pair 10 of telecommunication stations 6 and 8 where it will be encoded at station 6 and subsequently be transmitted to station 8, in a way similar to that described in Example 1. However, this time the identification means of station 8 will determine the existence of another operative pair of telecommunication stations (20), e.g. by detecting identification signal(s) transmitted by station 24, whereby establishing that an end-to-end compression mode of operation will prevail. The "hand-shake" procedure will be continue by station 8 transmitting its own identification signal, notifying station 24 to switch also to end-to-end compression mode of operation. The transmission will be forwarded by device 24 of pair 20 and decoded by the decompressing station 26. From there, the transmission will be delivered via exchange 18 to receiving means 3.

Once the operation mode is established, messages can be transmitted along the transmission path.

As was previously explained, the signal classification message can be embedded in each one of the frames transmitted, or alternatively be transmitted only when a requirement arises for designating a change in the type of the transmitted signal. Naturally, some further variations can be made while implementing this concept of embedded message, e.g. transmitting a group of zeros when no change occurs, etc.

It should also be understood that when a message is constructed in a manner similar to that described above, the non-compressed signals lack part or all of their less significant bits, which are allocated for the transmission of the compressed signals. However, the non-compressed information received might still be intelligible for monitoring and/or other practical purposes. As explained before, the compressed information is transmitted in the end-to-end compression mode only after each pair of stations identifies the existence of the other pair, and the rate (algorithm) that will be used for the compression of the transmission is established by using an appropriate command. Such a command may also be used in synchronizing the operation of de-compressor (8) and compressor (24). Other more complicated commands, in which a part of the non-compressed signals, preferably the less significant bits part thereof, may also be used for various purposes, and should be understood to be encompassed by the present invention.

Let us now assume that the compressing algorithm used in the system is LD-CELP. Using this algorithm means that 16 Kb/s out of the 64 Kb/s in the frame illustrated, are assigned for the transmission of compressed information. Now, when the demand for bandwidth in the network increases, one way of complying with the new demand is for the upstream telecommunication station 6 to switch to a mode where the CS-ACELP algorithm is used. This latter algorithm requires that only 8 Kb/s out of the 64 Kb/s be assigned for compressed information signals. This rate reduction is also accompanied with transmission of a message to the downstream telecommunication stations notifying them of the rate change.

Example 3

The present Example refers to a case where a fax call is to be transmitted from transmitting means 11 to receiving means 12. By this example, the call will be routed through exchange 4 by the pair 10 of telecommunication stations 6 and 8, where it will be identified as a fax call by station 6 controller and channeled by the station's switch in accordance with this identification. The transmission will be demodulated by compressor 6, transmitted in its demodulated form through station 8, exchange 5 and station 24 to station 26 where the call will be re-modulated and transmitted via exchange 18 to receiving means 12.

In the reverse direction the call will be routed through the same exchanges. The call from the now transmitting means 12, will be transmitted through exchange 18 to be demodulated at station 26, and then transmitted by station 24, exchange 5 and station 8 to be re-modulated by station 6 operating as a de-compressor. Therefrom, the re-modulated call will be transmitted via exchange 4 to the now receiving means 11.

Let us now assume that prior to the fax call described above, a voice call as described in Example 2, took place.

At the end of that voice call, all exchanges involved (4, 5 and 18) disconnect the transmission path. The disconnection is detected by the end-to-end compression mechanism of both pairs 10 and 20 of the telecommunications station. Following this detection all stations involved revert to their default normal operation.

Once exchange 5 connects station 8 with station 24, the new connection demonstrated above for the fax call is established. At this point, both stations switch again to the compressed mode as described in Example 2. However, this time the system identifies that the call is a fax call, e.g. by detecting the characteristic 2100 Hz tone, and the transmission of fax messages will commence. In view of the fact that a communication session for fax transmission may be characterized as comprising a plurality of transmissions of varying rates having breaks in between, every time a new transmission begins, the signal classification message will also include an indication of the rate by which the signals to follow will be transmitted. Breaks in transmission (silence) are preferably considered in the system as being transmissions of zero bits. To retain the uniformity of transmissions, the silence messages will preferably be transmitted in the same format as the rest of the transmission, e.g. having a signal classification message as well as compressed and non-compressed parts of the zero bits being transmitted.

However, when a fax communications is detected, station 8 sends a message identifying a transmission of fax, preferably including the rate of transmission. Station 24 will follow the message received from station 8 and will transfer that message and the synchronized information bits, via the bearer to station 26, where the demodulated fax transmission is re-modulated. Naturally, the message undergoes re-modulation only when no further operative pair of telecommunication stations is to be found along the transmission path defined. If a further such operative pair of stations is detected, a similar procedure to the one described above may be followed, for every two neighboring stations, each belonging to another pair of telecommunication station.

Example 4

The present example describes a case where a subscriber (telephone 7) dials to a service center (29) requesting data link for communication. In this example, the voice call is routed via ISDN exchange 25 and exchange 18 to the pair 20 of the telecommunication stations 24 and 26. It is compressed by station 26, transmitted by station 24 and subsequently through exchange 5 and station 8 of pair 10 of telecommunication stations 6 and 8. The compressed message will then be decompressed at station 6. The call will further be transmitted through exchange 4 and ISDN exchange 27 to receiving means 9 of service center 29. After concluding the voice call established between 7 and 9, both sides may connect their data terminals. The call initiator connects data terminal 21 whereas the service provider connects terminal 23, thus starting a full duplex session of data communication therebetween.

At this point, pair 20 of telecommunication stations 24 and 26, identifies a clear channel requirement generated by 21. Following this identification, a signal classification message denoting that a new type of signal is about to be transmitted, is generated and transmitted by station 26 towards exchange 5 via station 24, indicating a change of the operation mode to clear channel. At the same time, pair 10 of telecommunication stations 6 and 8 identifies a clear channel requirement that is generated by 23, and a signal classification message is transmitted notifying the new type of signals from station 6 towards exchange 5 via station 8. In this way, a clear channel is established along the full length of the transmission path.

It is to be understood that the above description only includes some embodiments of the invention and serves for its illustration. Numerous other ways of managing various types of compressed signals in telecommunication networks may be devised by a person skilled in the art without departing from the scope of the invention, and are thus encompassed by the present invention.

What is claimed is:

1. A digital telecommunication station adapted to receive at least two different types of signals, operative in a digital communication system, and comprising:

at least one detector operative to receive signals carried along a transmission path and determine their type;

at least one switch controlled by said at least one detector, adapted to channel said signals in accordance with the determination of their type;

first identifier for determining whether said signals received are of a digital compressed form;

second identifier for determining whether the transmission path includes at least one further operative de-compressor adapted for decompressing signals when being transmitted in their compressed form;

at least two pairs of compressing/decompressing devices, each adapted to compress/decompress a different type of signals;

first transmitter operative in response to a determination made by said second identifier that said transmission path does not include at least one further operative decompressor adapted for decompressing the signals being transmitted in their compressed form; and second transmitter operative in response to a determination made by said second indentifier that said transmission path does include at least one further operative decompressor adapted for decompressing the signals being transmitted in their compressed form into the decompressed digital output signals.

2. A digital telecommunication station according to claim 1, wherein said at least two different types of signals are selected from the group consisting of voice signals, fax signals, data signals, voiceband data signals and video signals.

3. A digital telecommunication station according to claim 1, adapted to receive a signal classification message denoting the type of digital signals received at said digital telecommunication station.

4. A digital telecommunication station according to claim 3, wherein said signal classification message is transmitted to denote transmission of digital signals of a type which differs from the type of their preceding digital signals transmitted by the digital telecommunication station during a communication session.

5. A digital telecommunication station according to claim 4, wherein said signal classification message precedes the compressed digital signals contained in the same frame.

6. A digital telecommunication station according to claim 3, wherein said signal classification message further comprises compressed information signals and stuffing bits.

7. A digital telecommunication station according to claim 6, wherein said stuffing bits represent the non-compressed form if said compressed information signals or any part thereof.

8. A digital telecommunication station according to claim 1, wherein communication sessions are initialized with a pre-selected type of signals.

9. A digital telecommunication station according to claim 8, wherein said pre-selected type of signals is voice.

10. A digital telecommunication station according to claim 3, wherein said signal classification message is transmitted only prior to the transmission of digital signals of a type which differs from the type of the signals preceding said signal classification message.

11. A digital telecommunication station according to claim 3, wherein said signal classification message is included in any message transmitted during a communication session, following at least one change in the type of the digital signals transmitted.

12. A digital communication system for interconnecting a plurality of telecommunication trunks, carrying at least two different types of signals, via a transmission path, comprising:

first transmitter at at least a first end of the transmission network for transmitting digital signals;

at least one pair of digital telecommunication stations each station adapted to receive at least two different types of signals and comprising:

at least one detector operative to receive signals carried along a transmission path and determine their type;

at least one switch controlled by said at least one detector, which channels said signals in accordance with the determination of their type;

first identifier for determining whether said signals received are of a digital compressed form;

second identifier for determining whether the transmission path includes at least one further operative decompressor adapted for decompressing signals when being transmitted in their compressed form;

at least two pairs of compressing/decompressing devices, each adapted to compress/decompress a different type of signals;

second transmitter operative in response to a determination made by said second identifier that said transmission path does not include at least one further operative decompressor adapted for decompressing the signals being transmitted in their compressed form; and third transmitter operative in response to a determination made by said second identifier that said transmission path does include at least one further operative means adapted for decompressing the signals being transmitted in their compressed form into the decompressed digital output signals;

at least one further decompressor adapted for decompressing signals being transmitted in their compressed form;

receiver at at least a second end of the transmission network.

13. A digital communication system according to claim 12, wherein said at least two different types of signals are selected from the group consisting of voice signals, fax signals, data signals, voiceband data signals and video signals.

14. A digital communication system according to claim 12, wherein at least one of said digital telecommunication stations is provided with the option of establishing a communication connection with more than two other digital telecommunication stations.

15. A digital communication system according to claim 12, wherein at least one of the digital telecommunication stations is adapted to establish a communication link with a plurality of digital telecommunication stations, each located at a different end of a telecommunication network.

16. A digital communication system according to claim 14, wherein a transmission sent by at least one of said telecommunication stations, is received in parallel by at least two other digital communication stations.

17. A digital communication system according to claim 12, wherein said at least one pair of telecommunication stations is adapted to receive a signal classification message denoting the type of digital signals received at each one of the pair of digital telecommunication stations.

18. A digital communication system according to claim 17, wherein said signal classification message further comprises information for synchronizing the operation of said at least one pair of telecommunication stations operating along a transmission path.

19. A digital communication system according to claim 12, further comprising means for determining mode of operation of facsimile signals.

20. A digital communication system according to claim 12, wherein said first transmitter further comprises means for transmitting an indication of the mode of operation of facsimile signals over the transmission network and to the receiver.

21. A digital communication system according to claim 12, wherein at least one pair of telecommunication stations is selectively operated along the transmission path.

22. A digital communication system according to claim 12, further comprising message generator and message detector operative at the second end of the transmission network to detect messages transmitted by the first transmitter.

23. A method for use in a digital communication system that comprises at least a first and a second telecommunication stations and adapted to transmit at least two different types of signals, which method comprises:

(i) transmitting a message comprising a sequence of characters identifying a first transmitting means, the type of signals to be transmitted and their destination;

(ii) establishing a communication link between a first transmitting means and a receiving means at the transmission destination;

(iii) exchanging signals between a first pair of telecommunication stations, identifying for each one of them the existence of the other and the rate for transmitting signals therebetween;

(iv) transmitting a message comprising a characterization of the signals to follow;

(v) transmitting information signals at the rate defined;

(vi) transmitting a message denoting the end of transmission; and (vii) disconnecting the communication link between the first transmitting means and the receiving means.

24. A method according to claim 23, wherein said at least two different types of signals are selected from a group consisting of voice signals, fax signals, data signals, voiceband data signals and video signals.

25. A method according to claim 23, for interconnecting a plurality of telecommunication trunks.

26. A method according to claim 23, further comprising conducting a periodic check at the second digital communication station to confirm that at least one further digital telecommunication station is operative along the transmission path.

27. A method according to claim 23, further comprising keeping track of pre-defined compression parameters of the messages being transmitted by the first digital telecommunication station of at least one pair of digital telecommunication stations along the transmission path.

28. A digital telecommunication station adapted to receive at least voice and fax type of signals, operative in a digital communication system, and comprising:

at least one detector operative to receive signals carried along a transmission path and determine their type;

at least one switch controlled by said at least one detector, adapted to channel said signals in accordance with the determination of their type;

first identifier for determining whether said signals received are of a digital compressed form;

second identifier for determining whether the transmission path includes at least one further operative de-compressor adapted for decompressing signals when being transmitted in their compressed form;

at least two pairs of compressing/decompressing devices, each adapted to compress/decompress a different type of signals;

first transmitter operative in response to a determination made by said second identifier that said transmission path does not include at least one further operative decompressor adapted for decompressing the signals being transmitted in their compressed form; and second transmitter operative in response to a determination made by said second indentifier that said transmission path does include at least one further operative decompressor adapted for decompressing the signals being transmitted in their compressed form into the decompressed digital output signals.

29. A digital telecommunication station adapted to receive at least voice and fax type of signals, operative in a digital communication system, and comprising:

at least one detector operative to receive signals carried along a transmission path and determine their type;

at least one switch controlled by said at least one detector, adapted to channel said signals in accordance with the determination of their type;

first identifier for determining whether said signals received are of a digital compressed form;

second identifier for determining whether the transmission path includes at least one further operative de-compressor adapted for decompressing signals when being transmitted in their compressed form;

at least two pairs of compressing/decompressing devices, each adapted to compress/decompress a different type of signals;

first transmitter operative in response to a determination made by said second identifier that said transmission path does not include at least one further operative decompressor adapted for decompressing the signals being transmitted in their compressed form; and second transmitter operative in response to a determination made by said second indentifier that said transmission path does include at least one further operative decompressor adapted for decompressing the signals being transmitted in their compressed form into the decompressed digital output signals, and wherein said digital telecommunication station is adapted to receive a signal classification message denoting the type of digital signals received by said digital telecommunication station.

30. A digital telecommunication station adapted to receive at least voice and fax type of signals, operative in a digital communication system, and comprising:

at least one detector operative to receive signals carried along a transmission path and determine their type;

at least one switch controlled by said at least one detector, adapted to channel said signals in accordance with the determination of their type;

first identifier for determining whether said signals received are of a digital compressed form;

second identifier for determining whether the transmission path includes at least one further operative de-compressor adapted for decompressing signals when being transmitted in their compressed form;

at least two pairs of compressing/decompressing devices, each adapted to compress/decompress a different type of signals;

first transmitter operative in response to a determination made by said second identifier that said transmission path does not include at least one further operative decompressor adapted for decompressing the signals being transmitted in their compressed form; and second transmitter operative in response to a determination made by said second indentifier that said transmission path does include at least one further operative decompressor adapted for decompressing the signals being transmitted in their compressed form into the decompressed digital output signals, and wherein said digital telecommunication station is adapted to receive a signal classification message denoting the type of digital signals which differs from the type of their preceding digital signals transmitted by the station during a communication session.

31. A digital communication system for interconnecting a plurality of telecommunication trunks, carrying at least voice and fax type of signals, via a transmission path, comprising:

first transmitter at at least a first end of the transmission network for transmitting digital signals;

at least one pair of digital telecommunication stations wherein each of the stations is adapted to receive at least voice and fax type of signals and comprising:

at least one detector operative to receive signals carried along a transmission path and determine their type;

at least one switch controlled by said at least one detector, adapted to channel said signals in accordance with the determination of their type;

first identifier for determining whether said signals received are of a digital compressed form;

second identifier for determining whether the transmission path includes at least one further operative decompressor adapted for decompressing signals when being transmitted in their compressed form;

at least two pairs of compressing/decompressing devices, each adapted to compress/decompress a different type of signals;

second transmitter operative in response to a determination made by said second identifier that said transmission path does not include at least one further operative decompressor adapted for decompressing the signals being transmitted in their compressed form; and third transmitter operative in response to a determination made by said second identifier that said transmission path does include at least one further operative means adapted for decompressing the signals being transmitted in their compressed form into the decompressed digital output signals;

at least one further decompressor adapted for decompressing signals being transmitted in their compressed form;

receiver at at least a second end of the transmission network.

32. A method for use in a digital communication system adapted to carry at least voice and fax type of signals and comprising a first and second telecommunication stations, which method comprises:

(i) transmitting a message comprising a sequence of characters identifying a first transmitting means, the type of signals to be transmitted and their destination;

(ii) establishing a communication link between a first transmitting means and a receiving means at the transmission destination;

(iii) exchanging signals between a first pair of telecommunication stations, identifying for each one of them the existence of the other and the rate for transmitting signals therebetween;

(iv) transmitting a message comprising a characterization of the signals to follow;

(v) transmitting information signals at the rate defined;

(vi) transmitting a message denoting the end of transmission; and (vii) disconnecting the communication link between the first transmitting means and the receiving means.

* * * * *